United States Patent [19]

Stauffer

[11] Patent Number: 4,605,540

[45] Date of Patent: Aug. 12, 1986

[54] LOW VOLATILE FLUORINE PROCESS FOR MAKING ELEMENTAL PHOSPHORUS

[76] Inventor: John E. Stauffer, 6 Pecksland Rd., Greenwich, Conn. 06830

[21] Appl. No.: 794,117

[22] Filed: Nov. 1, 1985

[51] Int. Cl.$^4$ .............................................. C01B 25/01
[52] U.S. Cl. .................................. 423/322; 423/167; 423/323
[58] Field of Search ....................... 423/322, 167, 323

[56] References Cited

U.S. PATENT DOCUMENTS 2,488,604  11/1949  Pike ..................................... 423/322
3,235,330   2/1966  Lapple ................................. 423/322

*Primary Examiner*—John Doll
*Assistant Examiner*—Jackson Leeds
*Attorney, Agent, or Firm*—Krass & Young

[57] ABSTRACT

The present invention concerns an improvement in the electric furnace process for making elemental phosphorus. The invention features the deliberate addition of an alkali to the burden or charge that is fed to the furnace. Several advantages are gained by the addition of an alkali: pollution is reduced by scavenging fluorine compounds, operating efficiencies are gained, and control over the process is simplified.

5 Claims, No Drawings

LOW VOLATILE FLUORINE PROCESS FOR MAKING ELEMENTAL PHOSPHORUS

DESCRIPTION

1. Field of the Invention

The present invention concerns an improvement in the electric furnace process for making elemental phosphorus. The invention features the deliberate addition of an alkali to the burden or charge that is fed to the furnace. Several advantages are gained by the addition of an alkali: pollution is reduced by scavenging fluorine compounds, operating efficiences are gained, and control over the process is simplified.

2. Description of the Prior Art

Except for minor modifications, the commercial process for making phosphorus has remained substantially unchanged since it was perfected near the end of the nineteenth century. Raw materials including a phosphorus ore, sand and carbon are fed to an electric furnace that is heated by graphite electrodes to about 1500° C. As the solids melt, a slag is formed as well as a second layer of molten iron, both of which are periodically tapped from the furnace. The elemental phosphorus and by-product gases are collected overhead, passed through an electrostatic precipitator to remove fines, and cooled for further processing.

The standard raw materials consist of the mentioned three principal constituents. The phosphorus ore generally is fluorapatite, which is referred to as phosphate rock. With the formula, $Ca_5(PO_4)_3F$, fluorapatite contains not only phosphorus tied up as a calcium salt but also significant quantities of fluorine. In addition to the phosphorus ore, a second constituent, sand, which is mostly silica, is added as a flux to reduce the melting point of the slag. Silica also acts as an acid at the elevated temperatures experienced in the furnace and thereby reacts with the calcium in the fluorapatite to liberate phosphorus oxide. The latter, with the formula $P_2O_5$, is reduced by the third constituent, carbon, to produce elemental phosphorus and by-product carbon monoxide.

Invariably the raw materials contain certain impurities. For example, iron oxide may be present in the sand or phosphate rock, and it is reduced in the furnace to iron, which in turn combines with some of the phosphorus to form ferrophosphorus. Some aluminum oxide may also be present, but it is unaffected by the reactions that occur in the process. Finally, some alkali may naturally be present in the ore. The literature indicates that a typical slag contains 1.08 percent potassium oxide as $K_2O$ and 0.42 percent sodium oxide as $Na_2O$. For the purpose of this invention, however, these quantities are insignificant and of no import as will be shown later.

The reactions which take place in an electric furnace are complex and not completely understood. Nevertheless, extensive studies have pointed to the likelihood of certain mechanisms. The solid burden is melted by the heat released as an electric current flows through the molten slag. The reactions take place primarily in the liquid phase. In addition to the formation of elemental phosphorus, part of the fluorine in the fluorapatite is released in the form of volatile compounds such as hydrogen fluoride, silicon tetrafluoride and fluorosilicic acid. The release of the volatile fluorine compounds in turn gives rise to potential environmental pollution problems.

It is therefore an object of the present invention to provide a process of the kind in question which will minimize the escape of fluorine so that pollution by fluorine can be brought under control.

It is also an object to provide a process for making elemental phosphorus that is thermally efficient.

It is a further object of the invention to provide a process for making phosphorus which facilitates the control over the power supply and relatively less dependent on temperature fluctuations.

These and other objects, features, and advantages will be seen from the following detailed description of the invention.

DETAILED DESCRIPTION OF THE INVENTION

In one preferred embodiment, the invention concerns a process for the production of elemental phosphorus by collecting volatilized elemental phosphorus from a molten furnace burden formed by melting phosphorus ore, sand and carbon in an electric furnace, comprising incorporating alkali, preferably soda ash, with the furnace burden. The alkali is used in an amount or proportion sufficient to suppress or inhibit the formation of volatile fluorine compounds. Through the addition of an alkali, the formation of volatile fluorine compounds is suppressed. The following equation illustrates the effect of adding alkali, in this case soda ash, to th furance burden.

$$4Ca_5(PO_4)_3F + 20SiO_2 + 2Na_2CO_3 + 30C \rightarrow 20CaO \cdot SiO_2 \cdot 1/5NaF + 2CO_2 + 30CO + 3P_4$$

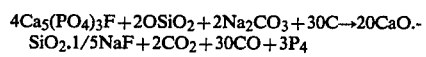

From the above equation, it is seen that sufficient soda ash is added to neutralize the fluorine and convert it to non-gaseous form that is inert. The stoichiometric amount is equivalent to about 5 weight percent $Na_2O$ in the slag. An excess of sodium, however, preferably a 20% excess expressed as $Na_2O$, up to 15% or higher, is used to ensure complete reaction with all of the fluorine. In any event, the amount of alkali employed substantially exceeds the amount of alkali impurities ordinarily present in phosphate rock and sand used in conventional methods.

An added advantage of incorporating a fluorine neutralizing quantity of alkali with the furnace charge, according to the invention, is that the alkali is an effective fluxing agent. By aiding the melting of the burden, the alkali achieves process efficiencies. The alkali serves to reduce the melting point of the slag, and in doing so provides improved thermal efficiencies. Since electric power is a principal cost of producing elemental phosphorus, any savings in its use are significant.

A further advantage of adding an alkali is that control over the power supply is made easier. This effect is demonstrated by the fact that alkali-free glasses have much steeper resistivity-temperature curves than common soda-lime glass (which contans 13–15 percent $Na_2O$). Thus, the addition of an alkali tends to flatten the resistivity curve, making the electrical resistance of the slag less dependent on temperature fluctuations.

Sodium compounds are preferred alkalis for purposes of the invention but other alkali compounds including lithium, potassium, rubidium and cesium compounds can be used with the furnace charge. Because sodium compounds are less costly and more readily available, these susbstances are preferred. To further save on raw material costs, a non-refined sodium ore or mineral such as trona may be used and is preferred. The slight level of impurities in trona are of little consequence when compared with the impurities introduced by the phosphate rock and sand.

Even slight improvements to the existing process for making elemental phosphorus can be significant. Phosphorus is an important commodity that has many practical uses. it can be converted to fertilizer, or it can be reacted to form diverse intermediates for use in insecticides, flame retardants, animal feeds, food additives, lubricants, and matches. Modern industry depends on a low cost supply of phosphorus for which there is no substitute.

The embodiments of the invention in which an exclusive property or privilege is claimed are defined as follows:

1. A process for the production of elemental phosphorus by collecting volatilized elemental phosphorus from a molten furnace burden formed by melting phosphorus ore, sand and carbon in an electric furnace, comprising incorporating alkali with the furnace burden in a proportion sufficient in the slag to suppress the formation of volatine fluorine compounds, the alkali being used in an amount equivalent to not less than about 5 to about 15 weight percent $Na_2O$ in the slag.

2. A process according to claim 1 in which the alkali comprises a sodium compound.

3. A process according to claim 1 in which the alkali comprises a sodium-containing ore.

4. A process according to claim 1 in which the alkali comprises soda ash.

5. A process according to claim 1 in which the alkali comprises trona.

* * * * *